Jan. 20, 1970 A. C. BIANCHI 3,491,193

INSTRUCTION DEVICE

Filed Feb. 13, 1968 2 Sheets-Sheet 1

INVENTOR:
ARMOND C. BIANCHI
BY
Howson & Howson
ATTYS.

Jan. 20, 1970 A. C. BIANCHI 3,491,193

INSTRUCTION DEVICE

Filed Feb. 13, 1968 2 Sheets-Sheet 2

INVENTOR:
ARMOND C. BIANCHI
BY
Howson & Howson
ATTYS.

United States Patent Office 3,491,193

Patented Jan. 20, 1970

3,491,193
INSTRUCTION DEVICE

Armond C. Bianchi, 4019 Redden Road, Drexel Hill, Pa. 19026

Filed Feb. 13, 1968, Ser. No. 705,088
Int. Cl. G09b *19/02*
U.S. Cl. 35—9 7 Claims

ABSTRACT OF THE DISCLOSURE

An instruction device comprising a card bearing printed questions and answers, and a card holder adapted for selective exposure of said questions and answers, said card including a reversely folded flap portion engageable with guide means on the card holder to provide a slidable retention of the card within the holder.

The present invention relates generally to instruction devices and relates more particularly to instruction devices characterized by a card bearing questions and answers which is slidable relative to a card holder to selectively expose the question and answer data thereon.

Teaching devices utilizing a slidable card bearing question-answer data have been in use for some time for such purposes as teaching multiplication tables, languages, etc. However, in prior devices in general, it is relatively difficult to remove and insert the cards as well as to manipulate the cards during use of the devices. Furthermore, prior devices have been costly to manufacture and are not generally adapted to the reversal of the data carrying card to utilize the space on the reverse side thereof.

In the present invention, the data bearing card includes a flap portion extending along a side edge thereof which is foldable back into the plane of the card and which is adapted to engage guide means in the card holder. This arrangement permits a side edge of the card to protrude from the card holder, which side edge may be grasped to slide the card to the desired data position. The device is also suited for use with pages of an instruction book wherein the card holder is cooperatively engaged with a foldable flap portion of the book page and wherein the card holder is slid with respect to the book page to selectively reveal the desired questions and answers.

It is accordingly a first object of the present invention to provide an instruction device for selectively disclosing question and answer data of a novel and improved construction.

An additional object of the invention is to provide an instruction device as described which permits the easy replacement of the data cards in the card holder.

Another object of the invention is to provide an instruction device as described, the data bearing cards of which may be readily reversed, permitting the placement of data on both sides of the cards.

Still another object of the invention is to provide a novel card construction for an instruction device as described which permits the data for both sides of the card to be printed on a single planar surface to assure proper registration.

Still another object of the invention is to provide an instruction device as described which may be manufactured at low cost.

Additional objects and advantages of the invention will be more readily apparent from the following detailed description of an embodiment thereof when taken together with the accompanying drawings in which.

Figures 1, 2, 3, 9, 10:
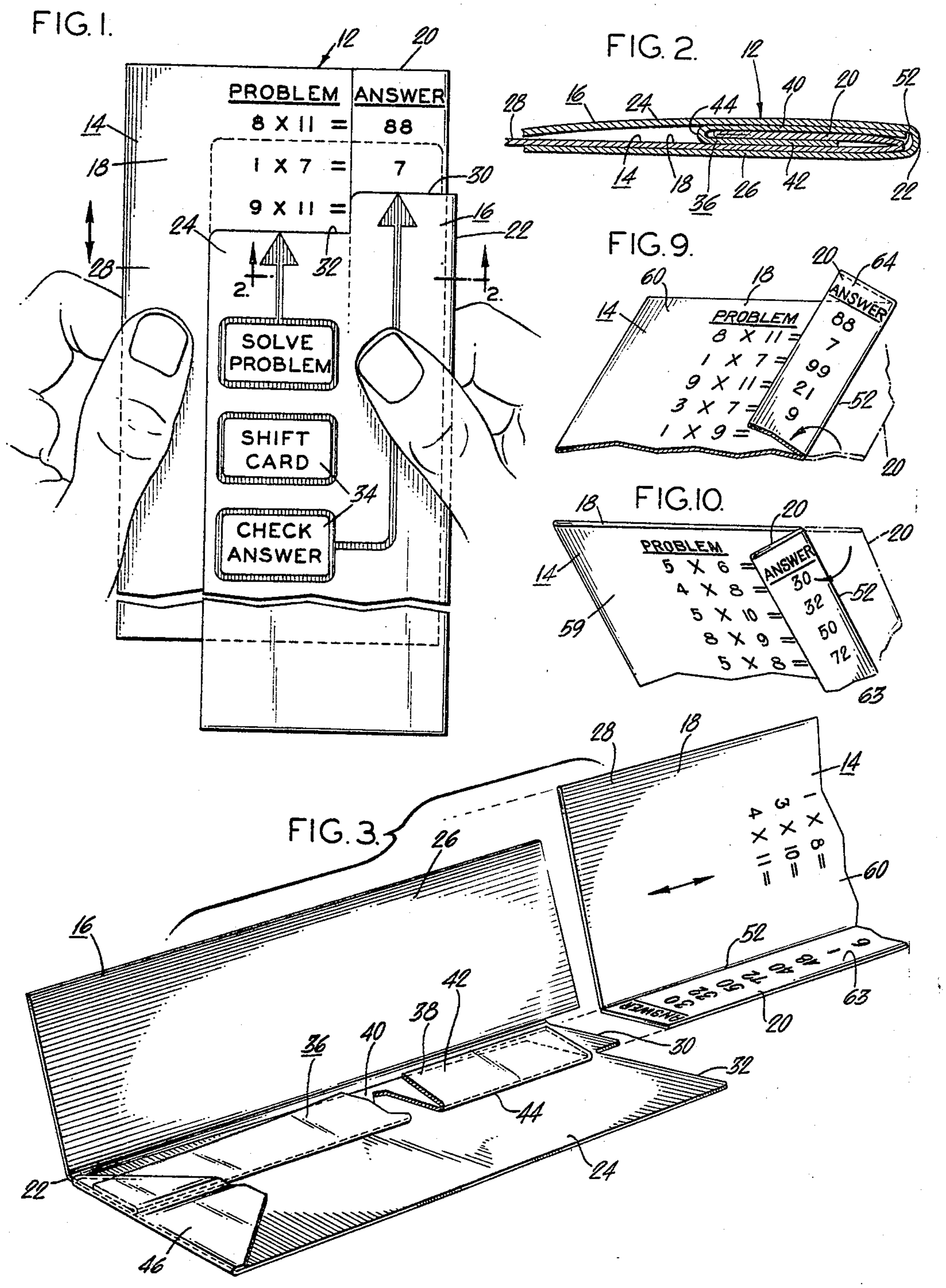
FIG. 1 is a plan view of an instruction device in accordance with the present invention showing the manner in which the data bearing card and the card holder may be slidably manipulated to selectively reveal the problems and answers set forth thereon.
FIG. 2 is an enlarged sectional view taken along line 2—2 of FIG. 1 showing the manner in which the flap portion of the card is slidably engaged within the guide means of the card holder.
FIG. 3 is an exploded perspective view of the card and card holder, broken away to show details of the card holder guide means.
FIG. 9 is a partial perspective view showing the manner in which the card is folded for insertion into the card holder.
FIG. 10 is a partial perspective view showing the manner in which the foldable card flap is reversed for use of the opposite side thereof.

Referring to the drawings and particularly FIG. 1 thereof, an instruction device generally designated 12 includes a card 14 bearing question and answer data, and a card holder 16 with respect to which the card is slidingly manipulated to reveal the desired data. The card 14 comprises a body portion 18 and a foldable flap portion 20 on which are printed columns of problems and their answers in corresponding relation. In the illustrated embodiment, the questions or problems are printed on the body portion 18 of the card and the answers are printed on the reversely folded flap 20.

The card holder 16 is formed of a sheet of cardboard or other suitable material folded along its right hand edge 22 to form front and rear panels 24 and 26 each of which has a width substantially smaller than that of the card 14 slidably positioned therewithin. A substantial portion 28 of the card accordingly protrudes from the open side of the card holder to permit manipulation of the card. The upper edge 30 of the card holder front panel 24 has a stepped configuration, the corner of the panel being cut away at 32 a sufficient degree to fully expose a question on the card while the answer remains hidden beneath the top edge 30 of the panel. It can be understood that incremental upward movement of the card will reveal the answer to the lowermost exposed question and at the same time reveal the succeeding question while concealing its answer. Suitable indicia 34 may be printed on the card holder to indicate the operation of the device.

The arrangement for slidably securing the card within the card holder may be most readily seen in FIGS. 2 and 3 wherein a guide means 36 is shown mounted on the rear of the front panel 24 adjacent the folded edge 22. While the guide means 36 may assume other forms, in the present instance it comprises a folded strip of cardboard or similar material 38 extending substantially the length of the front panel 24 parallel to the fold 22 of the panel sheet. The strip 38 includes a backer portion 40 which is glued or otherwise secured to the back of the panel 24, and a folded portion 42 which is folded parallel therewith, the fold 44 of the strip being directed toward the open side of the card holder. In assembly of the card and holder, the flap portion 20 is inserted between the portions 40 and 42 of the strip 38, the introduction of the flap portion therebetween being most readily carried out by the opening of the card holder to the position shown in FIG. 3 and inserting the card either from the end as shown or edgewise from the side. As shown in FIG. 2, the fold 44 of the strip 38 is spaced sufficiently from the fold 22 of the card holder to permit a slight transverse clearance of the flap portion 20 of the card, thereby allowing a smooth sliding movement of the card longitudinally within the card holder.

In the embodiment illustrated as shown in FIG. 3, a bottom flap 46 of the front panel 24 is folded up across the panel and across the strip 38 and serves to prevent movement of the card below the bottom edge of the card holder. While this is an optional feature of the invention, it does provide a starting point for the columns of questions and answers if the card is arranged as illustrated so that with the bottom edge of the card against the bottom flap 46, the first question is uncovered with the answer thereto concealed.

The question and answer data provided on the card may of course relate to virtually any subject matter such as mathematics, languages, history and so forth. In addition, the device could also be used for commercial applications such as decimal equivalents, sales tax computations, and the like. With the latter type of data, the question and answer would most destrably be simultaneously exposed either by means of a straight edge at the top of the card front panel, or by means of window like apertures which are well known with devices of this type.

One significant advantage of the present invention is the manner in which both sides of the card may be employed. By turning the card upside down and by reversing the fold of the flap portion, it can be seen that question and answer data may be carried by both sides of the card.

The removal and replacement of cards in the card holder may be easily and rapidly carried out by opening the card holder to the position shown in FIG. 3, and sliding the cards in or out of the folded strip 38. Closing the card holder secures the cards against transverse movement. Alternately, the cards may be slid endwise in and out of the strip without opening the holder. The unloading and loading of the holder requires only a few seconds time which is an important advantage when large numbers of cards are employed, for example, for vocabulary review in the study of a foreign language.

In view of the fact that the question and answer data on the card must be in accurate registration, a novel card permitting the printing of the question and answer data for both sides of the card on a single surface is shown in FIGS. 4–8. The card 14 in this embodiment comprises a rectangular sheet of paperboard 50 having a width equal to the desired length of the card. The sheet 50 is scored at 52 along a line parallel to the side edges 54 and 55 thereof. The score line 52 divides the sheet into a small answer section 56 and a much larger question section 57 on which are respectively printed columns of answers and questions in correspondingly aligned relation. Fold lines 58 parallel to score line 52 divides the question section 57 into substantially equal panels 59 and 60. Similarly, fold line 62 divides the answer section 56 into substantially equal sized panels 63 and 64. Columns of questions and answers are printed in the panels 59, 60, 63 and 64. The questions of panel 59 have corresponding answers in panel 63, and the questions of panel 60 have answers in panel 64. It is necessary that one set of question-answer data be inverted with respect to the other to provide the proper data orientation upon reversal of the card in the holder.

Figures 4, 5, 6, 7:
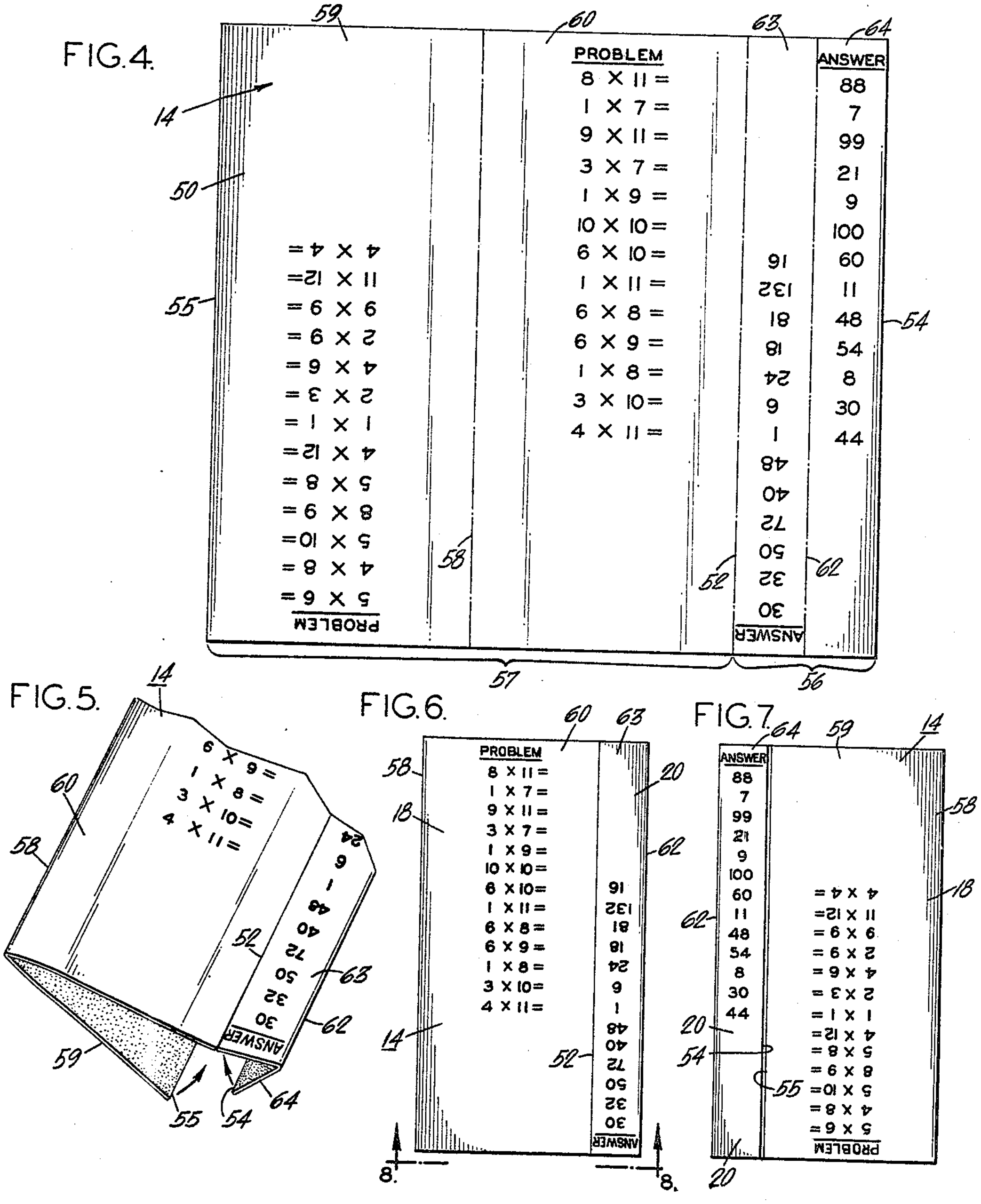
FIG. 4 is a plan view showing the card blank with the data printed thereon prior to folding and glueing.
FIG. 5 is a partial perspective view showing the card of FIG. 4 in a partly folded position.
FIG. 6 is a plan view showing one side of the card following the folding and glueing operation.
FIG. 7 is a view of the reverse side of the card shown in FIG. 6.
Figure 8:
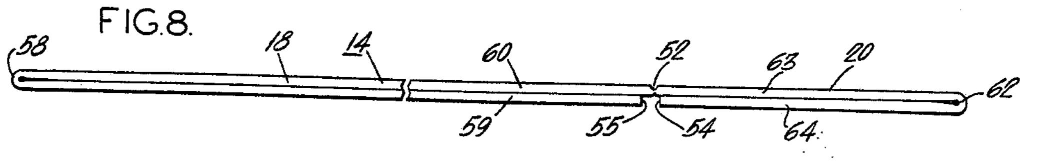
FIG. 8 is an enlarged view taken along line 8—8 of FIG. 6 and showing the manner in which the card is scored to permit the reverse folding of the flat portion.

Adhesive is applied to the underside of the sheet 50 and the panels 59 and 64 are then folded back as shown in FIG. 5 along fold lines 58 and 62 against panels 60 and 63 to form the card illustrated in FIGS. 6–8. As shown in FIG. 8, a slight gap exists between side edges 54 and 55 to permit folding of the flap portion 20 along the score line 52.

In view of its laminated character, the card shown in FIGS. 4–8 may be prepared from relatively thin stock. A paperboard having .007 thickness has been found satisfactory for this purpose. The fact that only one thickness is involved at the flap hinge permits an easy fold of the card along the double scored line 52.

As suggested above, the invention may be employed in a book type arrangement wherein the pages of an instruction book each includes a foldable flap portion which cooperates with a card holder similar to that illustrated. In such an arrangement, the card holder is incrementally moved with respect to the book during operation of the device.

The card holder may take various forms other than that illustrated. For example, the holder could be made from sheet aluminum in a rigid embodiment, utilizing a longitudinal inwardly facing shoulder in the front panel as a guide means for the card flap. The natural resilience of the flap would maintain the flap edge in engagement with the shoulder and permit insertion of the card transversely into the holder.

Manifestly, changes in details of construction can be effected by those skilled in the art without departing from the spirit and the scope of the invention as defined in and limited solely by the appended claims.

I claim:

1. An instruction device comprising a card bearing printed data, and a card holder for selectively exposing said data, said card comprising a body portion and a reversely folded flap portion, said card holder including guide means adapted to cooperate with said card flap portion to permit relative movement of the card and holder only in a direction parallel to said flap portion, and means on said card holder permitting a selective exposure of said printed data upon incremental relative movement of said card and card holder.

2. An instruction device as claimed in claim 1, wherein a substantial portion of said card opposite said flap portion extends beyond the card holder to permit sliding manipulation thereof.

3. An instruction device as claimed in claim 2, wherein said card holder includes a front panel adapted to selectively cover the data on said card, said guide means being carried on the back of said front panel adjacent one edge thereof.

4. An instruction device as claimed in claim 3, wherein said card holder includes front and rear panels joined along a fold line, said guide means on said front panel comprising a folded strip adjacent and opening toward said fold line adapted to receive said card flap portion.

5. An instruction device as claimed in claim 1, wherein said data includes a column of questions printed on said card body portion, and a column of corresponding answers printed on said flap portion.

6. An instruction device as claimed in claim 5, wherein said means permitting a selective exposure of said data comprises a stepped configuration of an edge of said card holder transverse to the direction of permissible relative movement of said card and card holder.

7. An instruction device as claimed in claim 6, including means for initially positioning said card in said card holder to expose only the first question thereon.

References Cited

UNITED STATES PATENTS

| | | | |
|---|---|---|---|
| 1,641,982 | 9/1927 | McDade. | |
| 2,632,963 | 3/1953 | Drury | 35—75 |
| 3,111,775 | 11/1963 | Schade | 35—9 |

EUGENE R. CAPOZIO, Primary Examiner

J. WOLFF, Assistant Examiner

U.S. Cl. X.R.

35—31, 75